United States Patent
Triplet et al.

(10) Patent No.: US 10,965,527 B2
(45) Date of Patent: Mar. 30, 2021

(54) REGISTERING COLLABORATIVE CONFIGURATION CHANGES OF A NETWORK ELEMENT IN A BLOCKCHAIN LEDGER

(71) Applicant: Ciena Corporation, Hanover, MD (US)

(72) Inventors: Thomas Triplet, Manotick (CA); Emil Janulewicz, Nepean (CA); David Côté, Gatineau (CA)

(73) Assignee: Ciena Corporation, Hanover, MD (US)

( * ) Notice: Subject to any disclaimer, the term of this patent is extended or adjusted under 35 U.S.C. 154(b) by 33 days.

(21) Appl. No.: 16/296,604

(22) Filed: Mar. 8, 2019

(65) Prior Publication Data

US 2020/0287788 A1 Sep. 10, 2020

(51) Int. Cl.
*H04L 12/24* (2006.01)
*H04L 9/06* (2006.01)

(52) U.S. Cl.
CPC .......... *H04L 41/0813* (2013.01); *H04L 9/06* (2013.01); *H04L 41/0856* (2013.01); *H04L 41/16* (2013.01); *H04L 2209/38* (2013.01)

(58) Field of Classification Search
CPC ... H04L 41/0813; H04L 9/06; H04L 41/0856; H04L 41/16
See application file for complete search history.

(56) References Cited

U.S. PATENT DOCUMENTS

| | | | |
|---|---|---|---|
| 9,871,582 B2 | 1/2018 | Djukic et al. | |
| 9,924,392 B2 | 3/2018 | Côté et al. | |
| 2016/0212623 A1 | 7/2016 | Côtéet al. | |
| 2016/0330083 A1 | 11/2016 | Djukic et al. | |
| 2018/0248771 A1 | 8/2018 | Côté et al. | |
| 2018/0248905 A1 | 8/2018 | Côtéet al. | |
| 2019/0207965 A1* | 7/2019 | Espinosa | G06F 16/9538 |
| 2019/0303853 A1* | 10/2019 | Cantrell | G06F 16/1824 |
| 2019/0333059 A1* | 10/2019 | Fallah | H04L 9/3239 |
| 2020/0092091 A1* | 3/2020 | Muller | G06F 16/27 |
| 2020/0167319 A1* | 5/2020 | Fritz | H04L 9/3239 |

* cited by examiner

*Primary Examiner* — Nasser M Goodarzi
*Assistant Examiner* — Adil Ocak
(74) *Attorney, Agent, or Firm* — Clements Bernard Walker; Lawrence A. Baratta, Jr.; Christopher L. Bernard

(57) ABSTRACT

Systems and methods for enacting or applying configuration changes (e.g., updates, optimizations) in a network element of a production network are provided. The configuration changes may be proposed and enacted in a collaboration system between artificial intelligence (AI) devices and human-controlled devices. According to one implementation, a system includes a production network having a plurality of network elements and a computer connected to the production network. The computer is configured to request a new configuration update regarding a first network element. The system further includes an electronic ledger configured to store a history of one or more configuration updates that have been previously enacted with respect to the first network element.

20 Claims, 6 Drawing Sheets

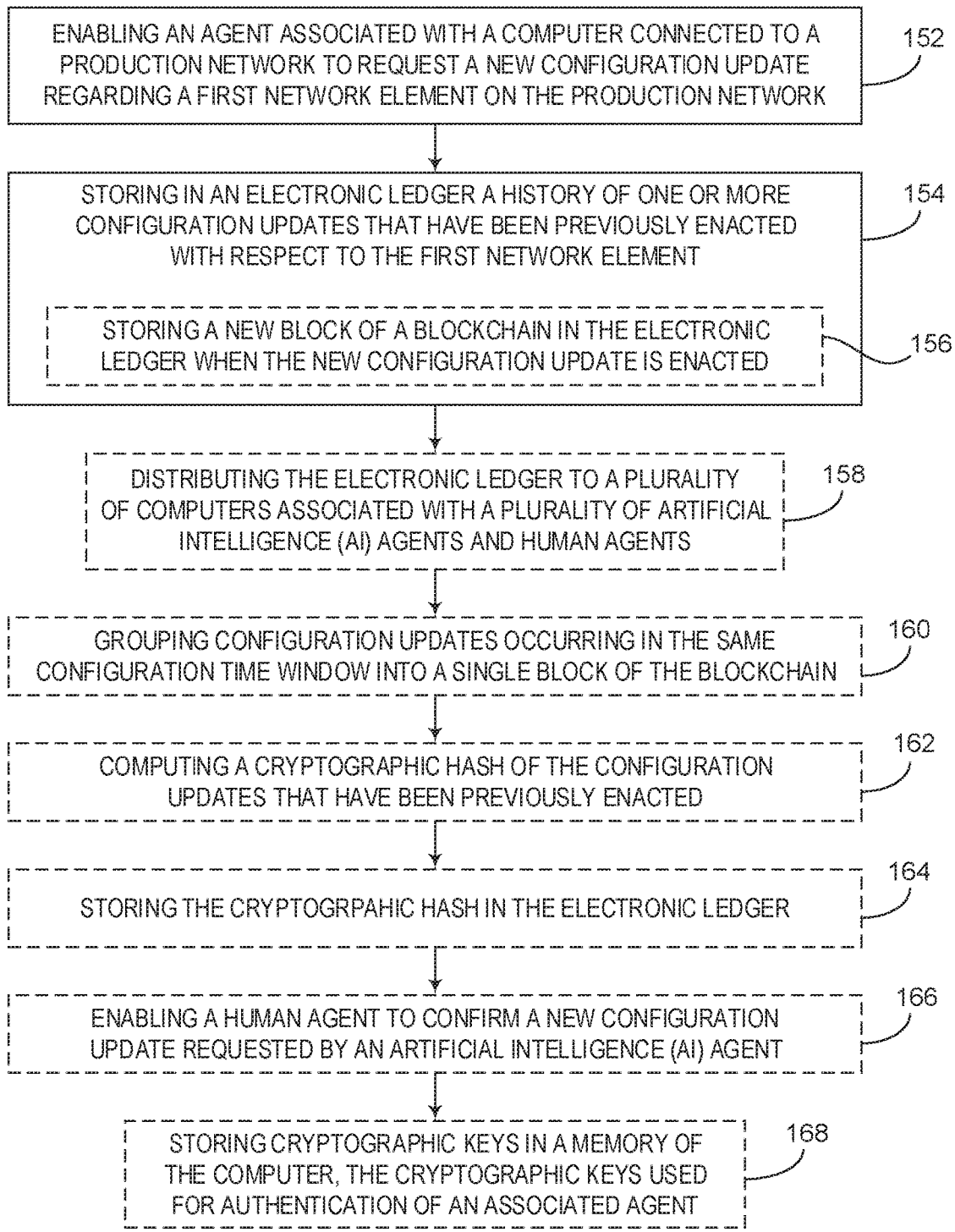

REGISTERING COLLABORATIVE CONFIGURATION CHANGES OF A NETWORK ELEMENT IN A BLOCKCHAIN LEDGER

FIELD OF THE DISCLOSURE

The present disclosure generally relates to networking systems and methods. More particularly, the present disclosure relates to systems and methods for collaboratively enacting configuration updates to a network element in a production network and securely registering the configuration updates in an electronic ledger having a blockchain structure.

BACKGROUND OF THE DISCLOSURE

Currently, production networks can be controlled by human-based computing devices and Artificial Intelligence (AI) computing devices. The configuration of network elements of a production network can be updated or changed by these computing devices in order to correct errors in the configuration and to make improvements in the operation of the network elements. This collaboration results in the improvement of the production networks and is able to recognize the contributions that various entities have made toward improving the network. These production networks can be controlled via various approaches, including control planes, Software Defined Networking (SDN) controllers, Network Management Systems (NMS), and the like.

Although there is a movement towards autonomous control (e.g., AI-based network control), the reliability of various AI systems can vary. Also, the reliability of agents of human-controlled computers may also vary. Conventionally, collaborative systems use a "proof of work" system, where computers compete to be the first to enact configuration changes. However, quicker solutions do not always equate to reliable solutions.

Most issues in a production network are caused by configuration errors in the network elements when changes or updates to the configuration are enacted. Also, there are currently no secure ways to keep a history of configuration updates and thereby determine which source is responsible for enacting configuration changes that may create errors. Therefore, a need exists for improved supervision of configuration updates and for securely tracking or registering prior configuration updates so that accountability can be determined.

BRIEF SUMMARY OF THE DISCLOSURE

Systems and methods for enacting configuration updates in a network, such as production network, are described in the present disclosure. According to one embodiment, a system includes a production network having a plurality of network elements and a computer connected to the production network. The computer may be configured to request a new configuration change, such as an update or optimization of a configuration, regarding a first network element. The system may also include an electronic ledger configured to store a history of one or more configuration updates that have been previously accepted or enacted with respect to the first network element.

According to an embodiment of a method for creating and enacting configuration updates, the method includes a step of enabling an agent associated with a computer connected to a production network to request a new configuration update regarding a first network element on the production network. The method also includes the step of storing in an electronic ledger a history of one or more configuration updates that have been previously accepted with respect to the first network element.

According to another embodiment, a network feedback loop is connected to a production network. The network feedback loop includes a data telemetry device configured to monitor a condition of a network element of the production network. The network feedback loop also includes an artificial intelligence (AI) device configured to receive a signal from the data telemetry device regarding the condition of the network element. The AI system is further configured to determine a new configuration update to the network element based on the condition. The network feedback loop further includes a controller configured to apply the new configuration update to the network element. In addition, the network feedback loop may include a memory configured to store the new configuration update in an electronic ledger as a block of a blockchain. The block may be configured to store the new configuration update along with an encrypted version of one or more configuration updates that have been previously enacted with respect to the network element.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a flow diagram showing another embodiment of a method for enacting and recording configuration updates in a network.

DETAILED DESCRIPTION OF THE DISCLOSURE

Figure 1:
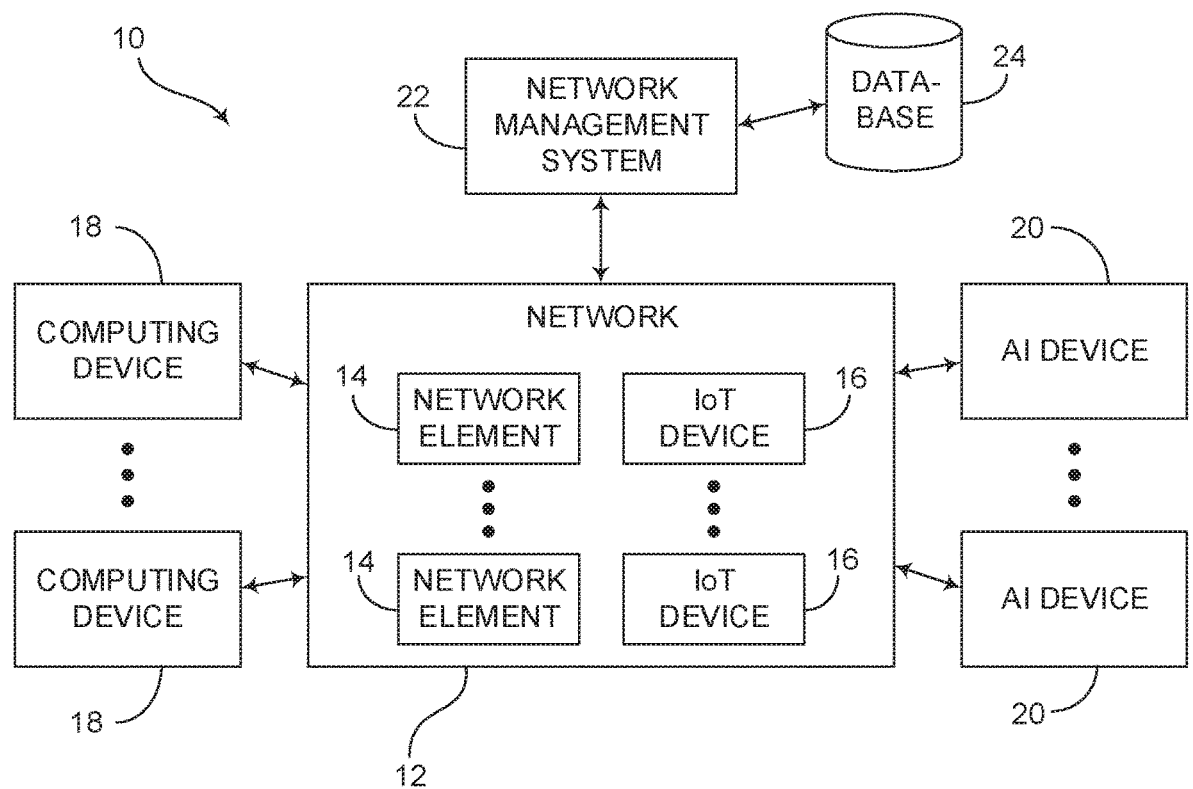
FIG. 1 is a block diagram of a collaborative system for enabling configuration updates to a network, according to one embodiment.

The present disclosure relates to systems and methods for enabling the creation of configuration updates in network elements of a production network and for enacting the configuration updates. In a collaborative system, human agents and artificial intelligence (AI) agents are allowed to make configuration updates to network elements or Internet of Things (IoT) devices in the network. The agents may utilize computing devices connected to the network. According to some embodiments, the system may include a supervisory hierarchy in which proposed configuration updates are submitted to a supervisor agent (e.g., a human agent). In a hierarchical structure, a human agent may be designated as a supervisor and can oversee the updates that are made. If the supervisor agent approves of the proposed updates, the configuration updates to the network element are enacted. Otherwise, the supervisor agent may reject the updates. Thus, the supervisor has the authority to accept or reject proposed updates.

As opposed to a hierarchical system, agents may be related to each other in a peer-to-peer structure, where every agent has equal authority to make updates as the agent sees fit. In such collaborative systems, several agents (also referred to as entities, parties, operators, actors, etc.) are able to make modifications to the network to update or optimize the network. The agents, as suggested above, may be human agents or AI agents. However, without a supervisor, unwanted changes or error may result.

The network, as described in the present disclosure, may be a production network that is able to be updated or changed by multiple parties. In this type of network, creation and generation of improvements and updates can be incorporated in the network elements of the network. The ability to create these updates will normally involve a certain level of creativity and innovation on the part of the various agents. The agents may have various levels of commitment to a particular project and may interact with the network in a local setting or remotely. In a remote collaboration system, information shared in the network for making configuration changes may essentially utilize the Internet as an assembly line, using common software development tools.

In conventional collaborative systems, configuration changes are not recorded in a manner to clearly define, for all agents, the details of the changes. In the present application, however, the collaborative system stores details about the transactions associated with the configuration updates. The transactions are stored in such a way, using cryptography, that an agent cannot easily change the records. The record of the encrypted updates is essentially immutable. For example, the configuration updates may be stored in blocks of a blockchain memory structure. The blockchain may include a new block added to the end of the chain, wherein the new block also includes a cryptographic hash of the content of all the previous blocks, along with details of the latest configuration update. Since the hash value cannot be changed without significantly changing the stored data, any tampering with the data in the blockchain can be easily discovered.

With a record of all configuration updates that have been made with respect to a network element, it is possible to determine who (or what device) made certain changes at certain times. This information can be used to establish accountability for the configuration updates. This information might be used with respect to service license agreements (SLAs) and other service assurance issues, smart contracts, or other network issues for determining liability.

According to various studies, the majority (i.e., about 75%) of production network issues originate from customer/configuration errors. In addition, as network operations become increasingly automated and adaptive to various conditions in near real-time, AI-based agents or smart policy engines may frequently update and optimize the configuration of the network. Conventional policy engines do not provide visibility of those operations to network operators, which can severely limit the ability to effectively deploy those smart adaptive systems in production networks.

Configuration and human errors are one of the primary reasons for issues on the network. Traditional network management systems may provide only a limited view of these configuration updates. Also, in the case of audits to the network configurations, the network management systems may not be reliable to establish the responsibility of configuration errors, such as in case of an SLA breach.

The present disclosure solves these issues by recording configuration updates in blockchain format, where each successive block includes all the content of the previous blocks in an encrypted form. Thus, the implementations described in the present disclosure seek to provide an improvement in the trustworthiness and accountability of AI-based smart policy engines and to provide visibility to carriers over all network configuration operations (whether automated or manual), while enabling collaboration between AI and human operators. The implementations described in the present disclosure can be adopted into adaptive network technologies in production networks and can provide a secure and reliable distributed transactional system to manage and distribute IoT devices or network elements configurations using permissioned blockchains, that can clearly and efficiently establish the liability of each party for service assurance and smart contract purposes.

FIG. 1 is a block diagram illustrating an embodiment of a collaborative system 10 for allowing a number of different entities or agents to collaboratively contribute updates to the configuration or operating elements of a network. In this embodiment, the collaborative system 10 includes a production network 12, which may include a plurality of network elements 14, Internet of Things (IoT) devices 16, and other components. In the collaborative system 10, a plurality of computing devices 18 and artificial intelligence (AI) devices 20 are connected to the production network 12, allowing the various entities or agents of the devices 18, 20 to create and apply configuration changes or updates to the network elements 14 and IoT devices 16.

The collaborative system 10 may also include a network management system (NMS) 22 configured to manage the configuration updates in the production network 12. In some embodiments, the NMS 22 may include a database 24 configured to store a record of configuration updates that have been made in the past plus any pending configuration updates.

The configuration of the network 12 is typically handled by the NMS 22 and is registered in the database 24. The database 24 may either be centralized (e.g., MySQL), or distributed (e.g., Cassandra/Kafka for MCP, Neo4J), and may rely on logs or a particular database EER model to provide historical data.

Thus, the database 24 may be a centralized storage device for storing an electronic ledger, as defined in the present disclosure. Each ledger may include a copy of a blockchain, which is a chain of blocks arranged in time sequence. Each block represents one or more new transactions representing changes to the configuration of a specific network element 14 or IoT device 16. Other transactions may include information regarding requests and approvals of requests for making configuration updates.

Some systems may rely on a "proof of work" arrangement, where computers compete to solve a problem on the network 12. Changes to the network 12 are based on the first computer to provide a solution. However, according to embodiments of the present disclosure, a "proof of trust" scenario is used. With proof of trust, the NMS 22 may rely on certain factors to determine how network elements 14 are changed. Instead of basing the configuration changes on the first computer to propose a change, the proof of trust arrangement may be based on "seniority" or other factors, such as a "trust score." Thus, the computer with the highest trust score may take priority over other computers with lower trust scores. In this way, changes are made to network elements based on the value of the sources that propose the changes and not necessarily on the sources that can provide the quickest solution. In this way, hasty solutions from less reliable sources may not be entered, but instead, the NMS 22 may give more value to the sources with a higher trust score.

Trust values may be assigned based on various factors, such as a recognized value of dependable sources. If an audit uncovers mistakes by a certain source, the trust value for this source may be reduced. However, reliable changes by a source may improve its trust score. Also, trust values may be based on seniority or the time that a source has been providing solutions for improving the network 12. One benefit to this system may be that fewer changes may be made to the network elements 14, which may lead to more efficient record keeping.

In the past, networks were changed frequently by various software tools. However, there was often no accountability for the changes that were made. The modifications to the network elements were like a black box for closed-loop automation. Therefore, the NMS 22 defined in the present disclosure may control the way that changes are recorded in order that every network element change can be reviewed at a later time to see if errors have been made in the configuration updates. The record of changes may be stored in the database 24 associated with the NMS 22, but, in other embodiments, the changes are recorded in an electronic ledger having a blockchain arrangement. This ledger can be distributed to the various entities (e.g., agents using computing devices 18 or AI device devices 20). In other embodiments, the ledger may be stored on a disk, in the cloud, or in other memory storage.

The blockchain arrangement is a linear chain of blocks arranged in time-sequential order. The blocks can be used to represent different network elements. More details of the blockchain structure are described below.

The production network 12, for example, can include one or more layers, such as optical (Layer 0), TDM (Layer 1), packet (Layer 2), etc. In one embodiment, the network element 14 can be a nodal device that may consolidate the functionality of a Multi-Service Provisioning Platform (MSPP), Digital Cross-Connect (DCS), Ethernet and Optical Transport Network (OTN) switch, DWDM platform, etc. into a single, high-capacity intelligent switching system providing Layer 0, 1, 2, and/or 3 consolidation.

The network elements 14 and IoT devices 16 may be configured as physical and/or virtual network elements. For example, the physical network elements may include switches, routers, cross-connects, add-drop multiplexers, and other physical devices. The virtual network elements may include Virtual Network Functions (VNFs) which can include virtual implementations of the physical network elements.

In another embodiment, the network elements 14 may include any one or more of an add/drop multiplexer (ADM), a multi-service provisioning platform (MSPP), a digital cross-connect (DCS), an optical cross-connect, an optical switch, a router, a switch, a Wavelength Division Multiplexing (WDM) terminal, an access/aggregation device, or other similar devices. The network elements 14 may be any device with ingress and egress signals and may include the functions of switching of packets, channels, timeslots, tributary units, wavelengths, etc. Those of ordinary skill in the art will recognize the systems and methods described herein can operate with other types of network elements and other implementations.

Figure 2:
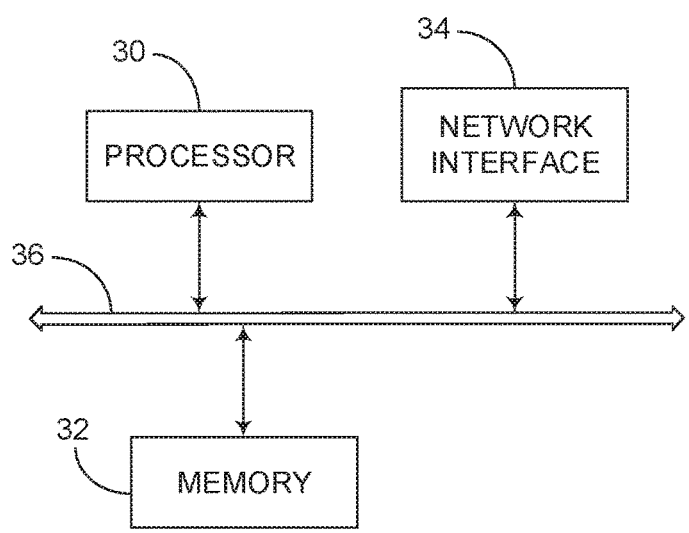
FIG. 2 is a block diagram of one of the computing devices shown in FIG. 1, according to one embodiment.

FIG. 2 is a block diagram illustrating an embodiment of one of the computing devices 18 shown in FIG. 1. According to some embodiments, the computing device 18 of FIG. 2 may include at least a processor 30, a memory 32, and a network interface 34, which may be interconnected with each other via a local interface 36. The computing device 18 may also include other components, such as user input devices, graphical user interfaces, etc.

As mentioned in more detail below, the memory 32 may be configured to store data and software for allowing the processor 30 to create configuration updates, make requests to have a supervisory agent review one or more proposed configuration updates, enact configuration updates, and perform other actions involving the processing of configuration changes. Also, the memory 32 may include software or firmware for creating a new block in a blockchain memory unit for registering new configuration updates being enacted. The memory 32 may also store a cryptographic key for encrypting historical content of previous configuration updates, whereby the encryption is performed to prevent a user from tampering with the historical information. The memory 32 may also include software or firmware for distributing the ledger, which may be designated to store the configuration updates, to one or more other computing devices 18, 20 in the collaborative system 10.

The computing device 18 may be identified as a server. It should be appreciated by those of ordinary skill in the art that FIG. 2 depicts the computer device 18 or server in an oversimplified manner, and some embodiments may include additional components and suitably configured processing logic to support known or conventional operating features that are not described in detail herein.

The processor 30 is a hardware device for executing software instructions. The processor 30 may be any custom made or commercially available processor, a central processing unit (CPU), an auxiliary processor among several processors associated with the computing device 18, a semiconductor-based microprocessor (in the form of a microchip or chip set), or generally any device for executing software instructions. When the computing device 18 is in operation, the processor 30 is configured to execute software stored within the memory 32, to communicate data to and from the memory 32, and to generally control operations of the computing device 18 pursuant to the software instructions.

It will be appreciated that some embodiments described herein may include one or more generic or specialized processors such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

The memory 32 may include a data store for storing data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be an internal hard drive connected to the local interface 36. Additionally, in another embodiment, the data store may be located external to the computing device 18, such as, for example, an external hard drive connected to I/O interface devices (e.g., SCSI or USB connection). In a further embodiment, the data store may be connected to the computing device 18 through a network, such as, for example, the production network 12.

The memory 32 may also include any types of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 32 may incorporate electronic, magnetic, optical, and/or other types of storage media. Note that the memory 32 may have a distributed architecture, where various components are situated remotely from one another, but can be accessed by the processor 30. The memory 32 may include non-transitory computer-readable storage media for storing one or more software programs. The software in memory 32 may include one or more software programs, each of which may include an ordered listing of executable instructions for implementing logical functions. The software in the memory 32 may include a suitable operating system (O/S). The operating system may essentially control the execution of other computer programs and provide scheduling, input/output control, file and data management, memory management, and communication control, and related services. The one or more programs may be configured to implement the various processes, algorithms, methods, techniques, etc. described herein.

The computing device 18 may include input/output (I/O) devices or interfaces, which may be used to receive user input from and/or for providing system output to one or more devices or components. User input may be provided via, for example, a keyboard, touchpad, and/or a mouse. System output may be provided via a display device, a printer, or other output device. I/O interfaces may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, a universal serial bus (USB) interface, and/or other suitable components.

The local interface 36 may be, for example, but not limited to, one or more buses or other wired or wireless connections, as is known in the art. The local interface 36 may have additional elements, which are omitted for simplicity, such as controllers, buffers (caches), drivers, repeaters, and receivers, among many others, to enable communications. Further, the local interface 36 may include address, control, and/or data connections to enable appropriate communications among the aforementioned components.

The network interface 34 may be used to enable the computing device 18 to communicate over a network, such as the production network 12, the Internet or other Wide Area Network (WAN), a local area network (LAN), or other type of network. The network interface 34 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 34 may include address, control, and/or data connections to enable appropriate communications on the network.

Figure 3:
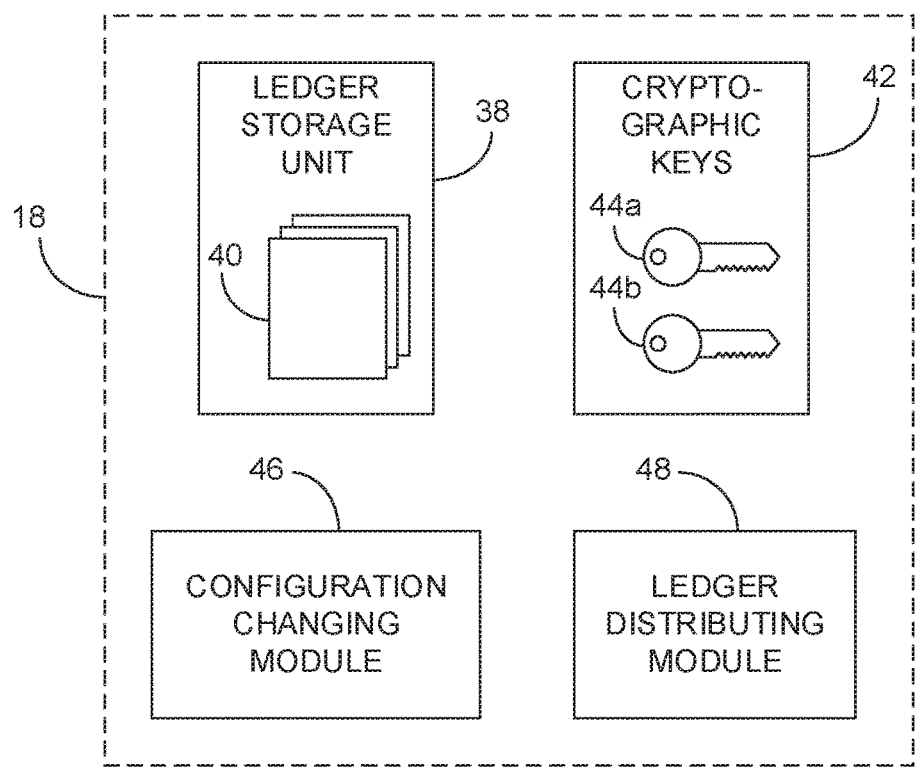
FIG. 3 is a block diagram of the memory shown in FIG. 2, according to one embodiment.

FIG. 3 is a block diagram illustrating an embodiment of the memory 32 shown in FIG. 2. As shown in FIG. 3, the memory 32 may store data in one or more storage units. The memory 32 may include a ledger storage unit 38 for storing one or more electronic ledgers 40. The stored ledgers may include the blockchain information for one or more network elements 14 or nodes. The memory 32 may also be configured to store cryptographic keys 42 (e.g., a private key 44a and one or more public keys 44b).

The memory 32 is also configured to store one or more software or firmware programs for allowing the processor 30 to perform the various functions described in the present disclosure. The memory 32 may include a configuration changing module 46, which may be configured to enable the processor 30 to make or propose changes to the configuration parameters of one or more network elements 14. Also, the memory 32 may include a ledger distribution module 48 configured to enable the processor 30 to distribute a valid configuration update to one or more other computing devices 18 and/or AI devices 20.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause the processor 30 to perform a set of operations, steps, methods, processes, algorithms, functions, techniques, etc. as described herein for the various embodiments.

The memory 32 may include a ledger storage unit 38 or another type of storage unit for storing one or more ledgers 40, as described in the present disclosure. Each ledger 40, for example, may be associated with a specific network node (e.g., network element 14, IoT device 16, etc.). The ledgers 40 are used to register new configuration updates for the network nodes and to store a record of the history of previous configuration updates made to the respective network node over time.

The ledgers 40 may include a structure similar to a blockchain configuration. For example, the blockchain configuration includes a number of blocks arranged in a sequential chain. Each block of the chain includes all the information from a previous block plus new information. In this regard, the information stored in the blocks is related to configuration updates that have been applied to the particular network element 14 or IoT device 16. In addition, the information associated with previously applied configuration updates may be encrypted to prevent tampering with the historical information.

The reason that the information is encrypted is to ensure that an accurate accounting of updates can be recorded. Thus, when a configuration error is discovered, the historical information can be used to determine the details of the configuration update or updates that may have caused the error. As such, it can be easy to determine the agent or agents who are responsible for making the erroneous updates. Also, the historical information may include other data, such as the time when the configuration was updated, the equipment used to make the update, any approvals that may have been given to apply the configuration update, and other information.

Also stored in the memory 32 of the computing device 18 are cryptographic keys 42. The cryptographic keys 42 may include a private key 44a and one or more public keys 44b. Unlike symmetric cryptography where the same key is used to encrypt and decrypt a message, asymmetric cryptography relies on a pair of private and public keys, where the private key (known only by the sender) is used to encrypt a message. The public key (shared with all), can be used to decrypt the message. The procedure is asymmetric because a public key can easily be generated from the private key, but computing the private key from the public key is computationally impractical (typically requiring millions of years on a modern computer). Asymmetric encryption is the basis of numerous security protocols, e.g., SSL/TSL. A canonical use-case of asymmetric cryptography is digital signatures, used for authentication of the sender and non-repudiation (i.e., the sender cannot claim he did not send the message).

The memory 32 of the computing device 18 may also include software that allows updates to the configuration code, such as a configuration changing module 46. The configuration changing module 46 may be configured to enable a user to enter updates to existing configurations. According to some embodiments, the configuration changing module 46 may allow a user to review a proposed or requested update submitted by another computing device 18 or AI device 20. In this sense, the user may be an agent acting in a supervisory role, such that the user can authorize the proposed update, authorize a modified version of the proposed update, reject the update, or perform any other action with respect to configuration updates that have not yet been applied to a network element 14 or IoT device 16, but updates which may require authentication by an expert in the field.

In some embodiments, the configuration changing module 46 may include AI for analyzing a problem and creating a solution in the form of a configuration update. For example, the configuration changing module 46 may be part of one or more of the AI computers 20 to allow configuration updates to be proposed without human involvement.

The memory 32 may also include a ledger distribution device 48. The ledger distribution device 48 may be configured to distribute one or more of the ledgers 40 stored in the ledger storage unit 38 of the memory 32 to one or more of the other computing devices 18 and/or AI devices 20 connected to the production network 12. The ledger distribution device 48 may be configured with the ability to share the ledger 40 with all agents associated with the computing devices 18 and AI devices 20 in order that the agents will have current configuration information. From the current configuration information, the agents can then make subsequent changes to the configuration or propose configuration updates as needed.

Suppose that multiple agents can apply a new policy or update the configuration of any number of nodes (e.g., network elements 14 or IoT devices 16) in the production network 12. Those agents may be human operators, consultants providing professional services, or an AI-based system that can autonomously update or optimize the network, optionally after confirmation by a human expert. Each agent may be assigned an asymmetric pair of cryptographic keys 42, that is, a private key 44a used to cipher the transaction and a public key 44b that can be used to decipher the transaction. This mechanism is used to authenticate the agent and for non-repudiation, which is essential when establishing liabilities.

For example, the memory 32 may contain a configuration changing module 44 that allows the processor 30 to propose or enact configuration changes and updates for one or more network elements 14. In some embodiments, the updated configurations can be stored in a blockchain arrangement, as described in the present disclosure, within the ledger storage unit 36.

The memory 32 also includes a ledger distribution module 44, which is configured to enable the processor 30 to distribute one or more ledgers stored in the ledger storage unit 36 to other computing devices 18 and/or AI devices 20 according to a predetermined ledger distribution protocol. The ledger distribution module 44 is configured to control the distribution of the ledger through the network interface 34 and through the production network 12 to the various computing devices 18 and AI devices 20. In some embodiments, the ledger distribution module 44 may be configured to send the ledger to the network management system 22 to allow the ledger to be stored in a central database, such as database 24. Distribution to the NMS 22 may be done in addition to the distribution to the devices 18, 20 or may be done as an alternative to distributing to the devices 18, 20.

Figure 4:
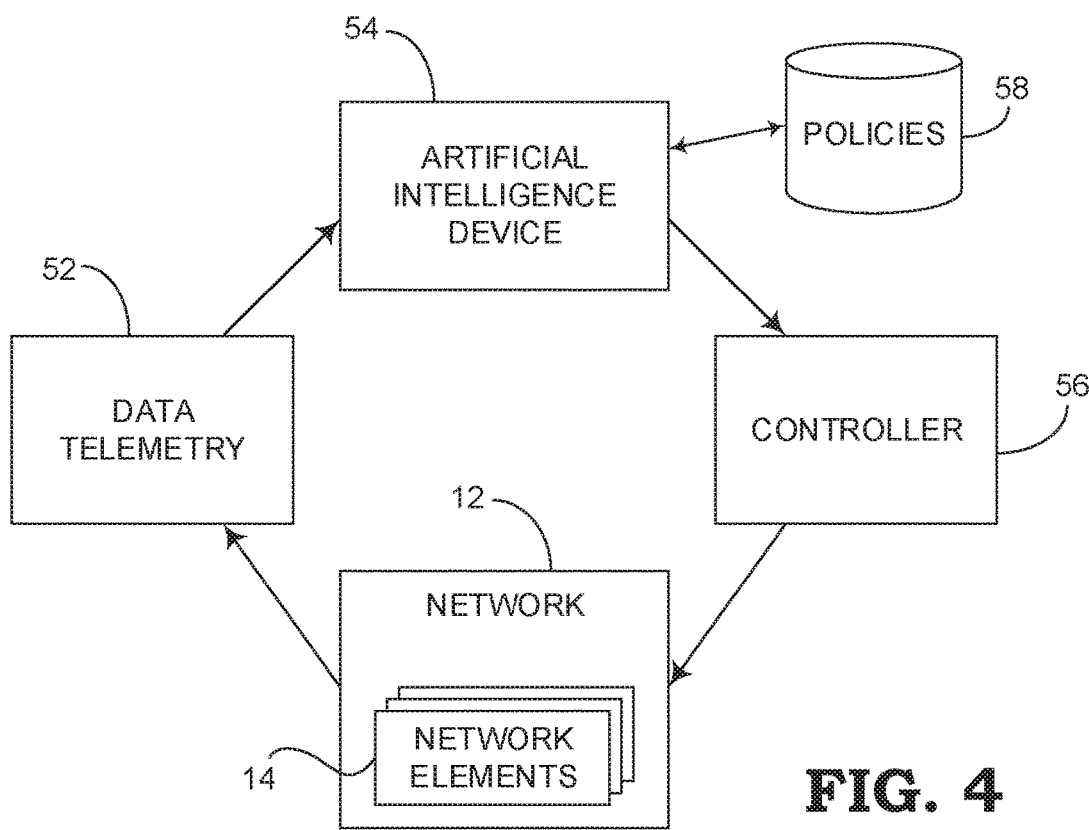
FIG. 4 is a block diagram of a feedback loop including one of the AI devices shown in FIG. 1, according to one embodiment.

FIG. 4 is a block diagram of an AI-driven feedback loop 50 for adaptive control of the production network 12. Data telemetry 52 may include measuring or sensing devices for detecting conditions of the network elements 14 and/or IoT devices 16. The production network 12 (also shown in FIG. 1) can be viewed as having a data plane in which network traffic operates and a control plane (or management plane) in which control of the data plane is performed. In this respect, the control plane may provide the data telemetry 52 during operation. The data telemetry 52 can include, without limitation, Operations, Administration, Maintenance, and Provisioning (OAM&P) data, Performance Monitoring (PM) data, alarms, and the like.

The AI-driven feedback loop 50 may include an Artificial Intelligence (AI) system 54 that is configured to receive the data telemetry 52, provide the data telemetry 52 as inputs to data-driven training and inference models, and provide results to a controller (or orchestrator) 56 for network control. The controller 56 may be configured to modify/update the network elements 14 and/or IoT devices 16 based on feedback from the AI system 54.

The AI system 54 may be represented by the AI computer 20 shown in FIG. 1. In some embodiments, the AI system 54 may be a server, network controller, SDN application, cloud-based application, etc. The AI system 54 may include a processing device which receives inputs (e.g., the data telemetry 52) and provides outputs to the network controller 56 for automated control of the network 12. The AI system 54 can also be referred to as a Machine Learning (ML)

inference engine. Various techniques for AI control, ML, etc. are contemplated. Some examples are described in commonly-assigned U.S. patent application Ser. No. 16/185,471, filed Nov. 9, 2018, entitled "Reinforcement learning for autonomous telecommunications networks;" U.S. Pat. No. 10,171,161, issued Jan. 1, 2019, entitled "Machine learning for link parameter identification in an optical communications system;" U.S. patent application Ser. No. 16/251,394, filed Jan. 18, 2019, entitled "Autonomic resource partitions for adaptive networks;" and U.S. patent application Ser. No. 15/896,380, filed Feb. 14, 2018, entitled "Systems and methods to detect abnormal behavior in networks." The entire contents of each application are incorporated by reference herein.

The AI-driven feedback loop 50 can play an instrumental role in adaptive network systems or the collaborative system 10 of FIG. 1. Such systems may normally need a response time (i.e., time to compute the probability of an outcome given input data) to be fast for identifying the optimal action that may be taken to change a network state or service state. This may be a complex decision that can be made by the AI-driven feedback loop 50, using input data patterns, network/service states, and other policies 58, rules, or conditions.

Generally, the AI system 54 may use one of two types of AI to drive the feedback loop 50. A first type of AI includes supervised or unsupervised pattern-recognition algorithms, which can be used to understand what is happening in the production network 12. A second type of AI includes reinforcement learning, which can be used to decide what actions should be taken on the production network 12.

The feedback loop 50 may also be configured as a Reinforcement Learning (RL) system. In an RL system, there may not be a need for human supervision and the AI system 54 can independently derive state information from the environment and decide on actions to affect that environment. The derived state information may include a service or resource instance in a given network domain. In the RL system, the feedback loop 50 may include a reward function that provides input to the AI system 54 or ML agent. The AI system 54 can provide an interpreter function observing the environment via the telemetry and monitoring data for current state information and determining the actions required to achieve a target state. The reward function may be used by the AI system 54 to maximize the probability, and thus the reinforcing behavior, of achieving the target state.

Typically, the AI system 54 acting as an RL system may be initially trained on a large data set in order to give it a base set of operational policies for business/service/network target states to invoke or maintain based on the state of the environment. Then, an inference model of the AI system 54 may continue to learn and refine its behavior as it is exposed to real-world behaviors and may also observe the results of its actions there. In some cases, the AI system 54 may need to experiment with an available set of possible actions constrained by operational policies while attempting to find the optimal action. In some cases, the operational policies themselves could be refined, i.e., dynamic policy, based on observed current state as well as actions taken in previous attempts.

RL may include one or more functions, such as defining costs and rewards to quantify network actions, determining allowed network actions, defining metrics describing a state of the production network 12, obtaining network data to determine a current state based on the defined metrics, and determining one or more of the network actions based on the current state and based on minimizing the costs and/or maximizing the rewards. That is, RL may include rewards/costs which set the objective/goal, a state which defines where the network 12 currently is relative to the objective/goal, and network actions which are used to drive the state towards the objective/goal.

Other types of Machine Learning (ML) can be used to drive closed-loop network applications and may include pattern-recognition and event-classification techniques, such as Artificial Neural Networks (ANN) and others. In this case, a set of raw inputs from the telemetry and monitoring data 52 can be turned into a higher-level insight about the network state, which in turn can be used to decide how to take actions to modify the production network 12. For example, collections of performance monitoring data can be interpreted by an AI as: "there seems to be a congestion happening on link X affecting services ABC," "bandwidth allocated to service D should become under-utilized for the next 8 hours and could be used elsewhere," "behavior of device Y suggests a high risk of failure within next 2-3 days," etc. As a result, network policies could take automated actions such as re-route low-priority away from link X, re-allocate some of the service D bandwidth to other services EFG or re-route services away from device Y and open a maintenance ticket.

Figure 5:
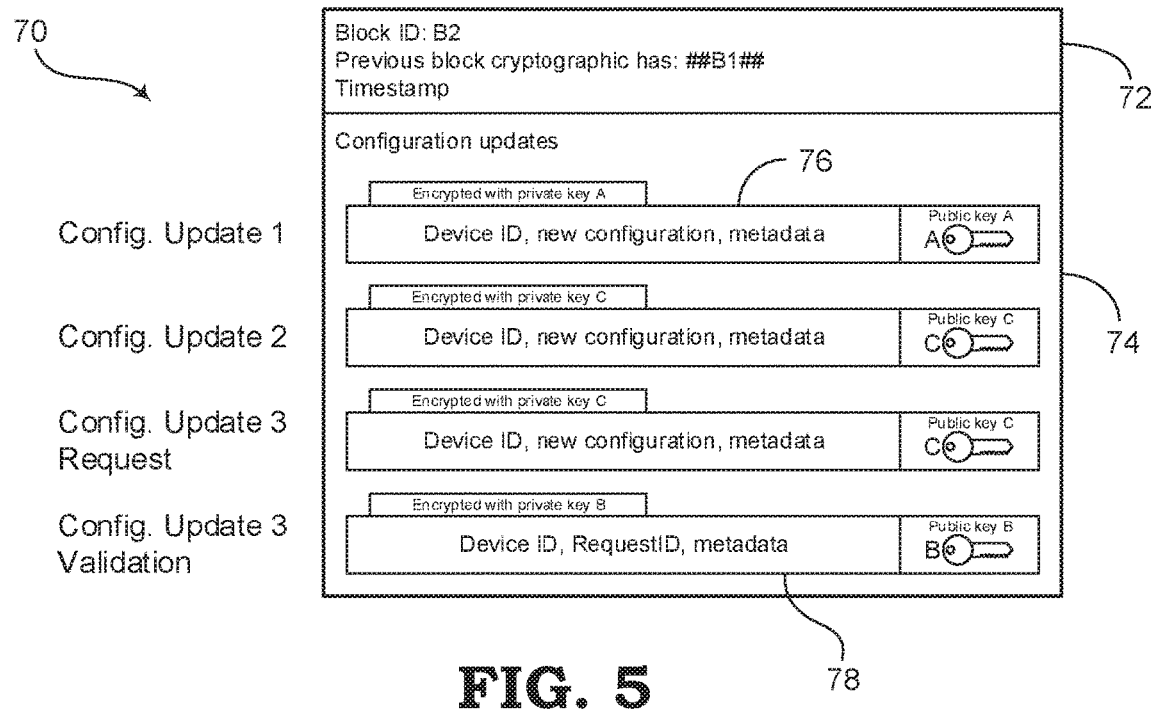
FIG. 5 is a block diagram of a block to be added to an end of a blockchain, according to one embodiment.

FIG. 5 is a block diagram illustrating an embodiment of a new block 70 to be added to an end of a blockchain. The block 70 includes a header 72 and a body 74. Each configuration or policy update by any agent may be recorded as a transaction in the block 70. The header 72 includes a block ID, a cryptographic hash value of a previous block, and a timestamp. The body 74 includes the current configuration update as well as previously enacted configuration updates. For example, a first configuration update ("Configuration update 1") is shown as being encrypted with a private key A, where "A" represents a first agent. The encrypted information of configuration update 1 can be viewed by using a public key (i.e., public key A). The second configuration update ("Configuration update 2") is shown as being encrypted with a private key C, where "C" represents a third agent. The encrypted information of configuration update 2 can be viewed by using a public key (i.e., public key C).

The encrypted information contains at least three types of data, such as a Device ID, the updated configuration, and metadata. The device ID is a unique ID of the device or port (e.g., MAC address, node name, etc.). The "updated configuration" is the version of the configuration at the time when the particular configuration was updated. The metadata may include, for instance, the machine learning (ML) model (or a reference to it) of the AI device 20, performance metrics that triggered the update, or a smart contract outlining the conditions for an update. Configuration updates occurring in the same configurable time-window may be grouped into a single block as shown in FIG. 5 while pending updates are not shown in the block 70.

As part of the new block 70 being created, a cryptographic hash is computed (e.g., using MD5, SHA1, or another algorithm) of the content of the last block within the chain currently registered in the ledger. The resulting hash value can be used to guarantee the integrity and reliability of the chain. For example, if an agent attempts to modify the content of any block of the chain, it will alter its hash, and therefore all subsequent blocks in the chain. As all nodes have a copy of the ledger (and the chain within), the discrepancy could be easily flagged and the culprit easily identified.

Figure 6:
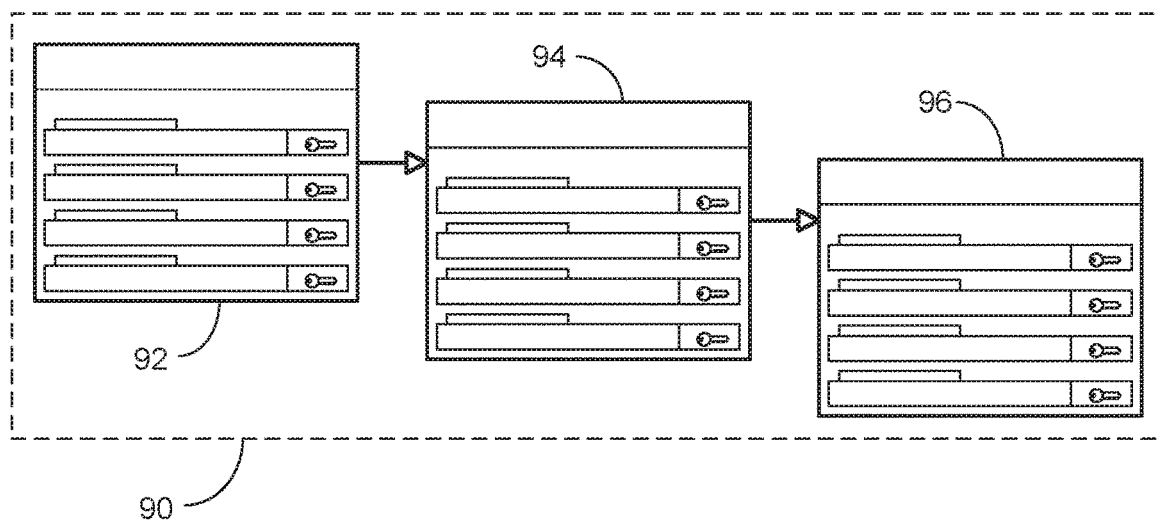
FIG. 6 is a block diagram of a ledger in which the block of FIG. 5 is registered, according to one embodiment.

FIG. 6 is a block diagram illustrating an embodiment of an electronic ledger 90 having a blockchain structure. The blocks 92, 94, 96 in this example are ordered in a time sequence where block 92 is the earliest block and block 96 is the latest block. Fewer or more blocks may be included the ledger 90, depending on the number of times that the configuration of a network element has been updated.

Similar to the block shown in FIG. 5, each block 92, 94, 96 shown in FIG. 6 includes a header and a body. The blocks include historic information, that is, the configuration updates that have previously enacted. Another entry in the block may include an update request, which is a pending configuration change that has yet to be confirmed by a supervisory agent. The block may also include another entry in which a requested configuration update has been validated by the supervisory agent. As such, two entries are recorded for the process where a change is requested, and then the change is validated.

Figure 7A:
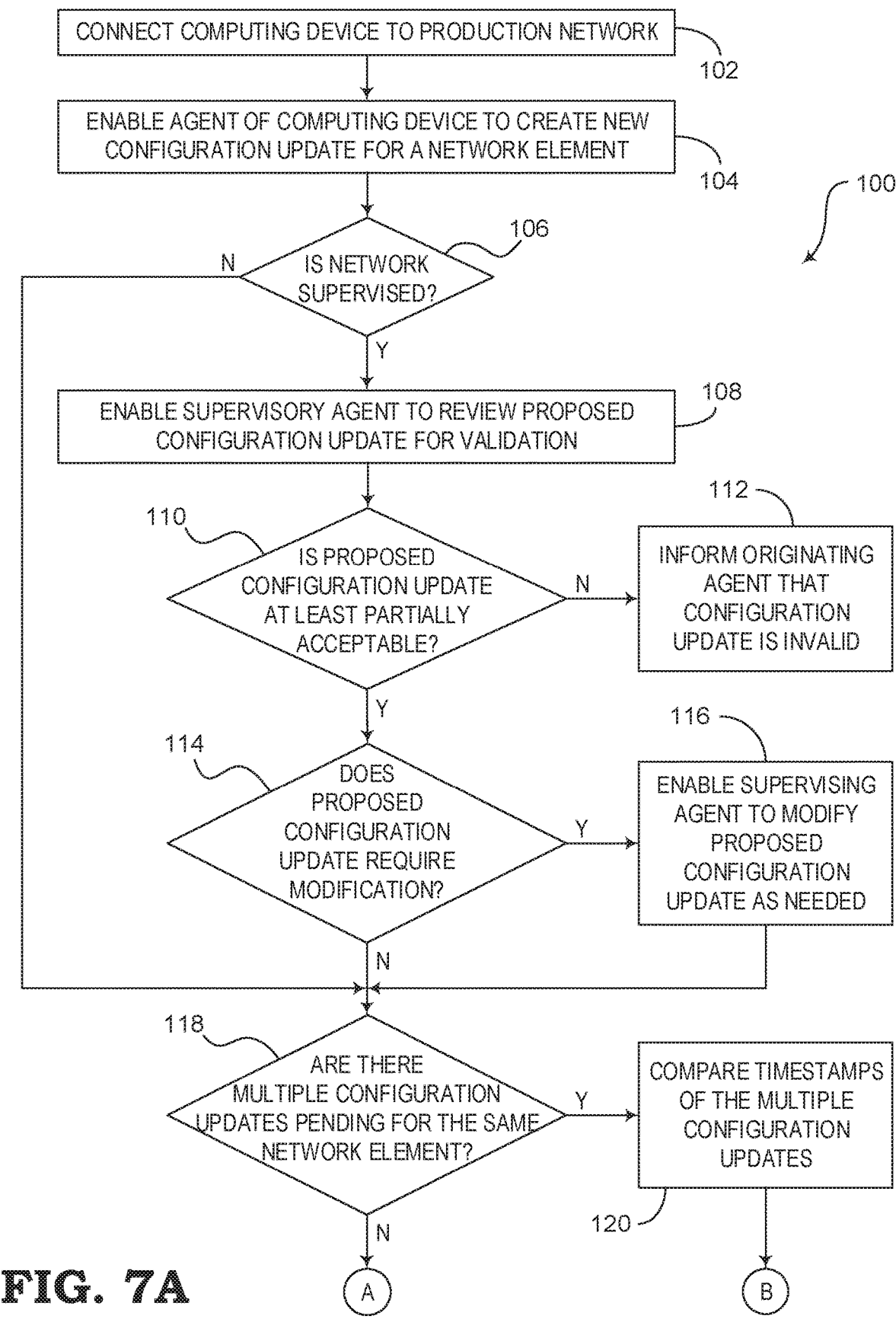
FIGS. 7A and 7B are flow diagrams of a method for creating and enacting configuration updates in a network and securely storing a history of the configuration updates, according to one embodiment.
Figure 7B:
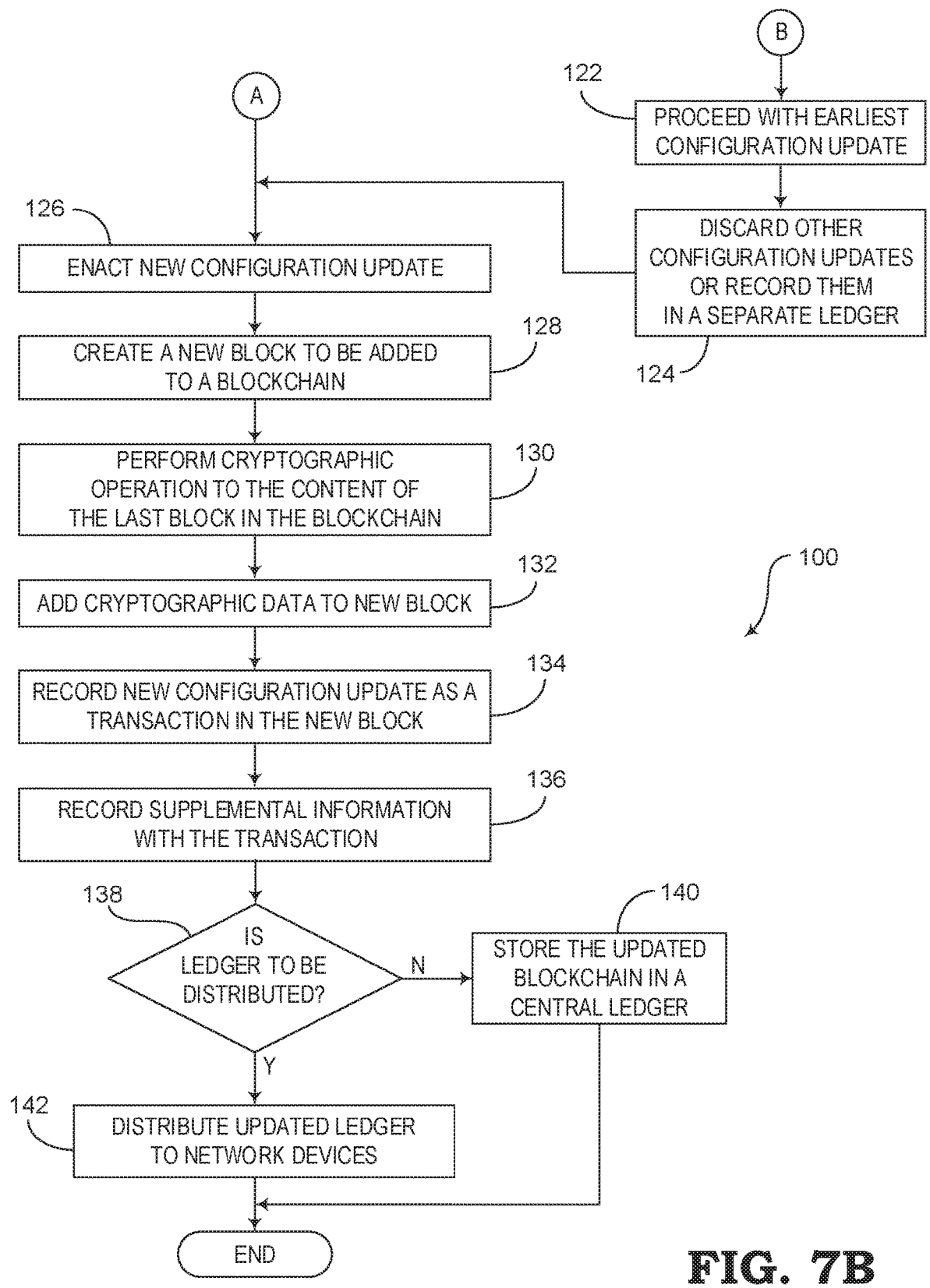

FIGS. 7A and 7B, in combination, form a flow diagram illustrating an embodiment of a method 100 for enacting and recording configuration updates in a network. As illustrated, the method 100 includes a first step of connecting a computing device to a production network, as indicated in block 102, to thereby allow the computing device to monitor the condition of network elements or nodes of the network. This initial connection step may only need to be performed once to allow the computing device to interact with the production network.

As indicated in block 104, the method 100 includes the step of enabling an agent associated with the computing device to create a new configuration update for a specific network element. At this point, the configuration update may simply be a proposed configuration change in a pending state and has not yet been enacted within the network. This step may be performed by a human agent or an AI agent.

The method 100 further includes a decision diamond 106, which determines if the network is a supervised network. In other words, it is determined whether or not the network is arranged in a "peer-to-peer" structure such that all agents have equal authority to make updates or in a "hierarchical" structure whereby one or more agents have a supervisory role to oversee updates made in the network. If the network is not supervised, the method 100 jumps ahead to decision diamond 118. However, if the network is a supervised network, the method 100 proceeds to block 108.

As indicated in block 108, the method 100 includes the step of enabling a supervising agent to review the new configuration update as a proposed configuration update. This review is performed for the purpose of validating or invalidating the proposed configuration update. The method 100 then proceeds to decision diamond 110, which indicates that the supervising agent determines whether or not the proposed configuration update is at least partially acceptable. If the proposed configuration update is unacceptable, the method proceeds to block 112, which indicates that the originating agent is informed that the proposed configuration update is invalid and will not be enacted. In some embodiments, the step of block 112 may further include an additional step of storing the rejected, proposed configuration update in a separate ledger. If the update is rejected, the method 100 at this point is completed for this proposed update, and the method 100 may end or loop back to block 104 to allow the entry of another proposed update.

If it is determined in decision diamond 110 that the configuration update is at least partially acceptable, the method proceeds to decision diamond 114, which indicates that a determination is made as to whether the proposed configuration update requires some type of modification. This step may be performed by a human agent on a supervisory computer device. If modifications are needed, the method 100 proceeds to block 116, which includes a step of enabling the supervising agent to modify the proposed configuration update as needed. After any modifications are made, the method 100 proceeds to decision diamond 118.

The step indicated in decision diamond 118 includes determining if multiple configuration updates are pending for the same network element. In other words, this step determines if two updates are requested at the same time and serves to prevent the blockchain from creating a fork branching off into two different directions or from including redundant blocks within the chain. If there are not concurrent updates pending, the method 100 skips ahead to block 126. Otherwise, if multiple updates are pending, the method diverts to block 120, which indicates that the timestamps of the multiple configuration updates are compared. Then, the method 100 includes proceeding with the use of the earliest configuration update, as indicated in block 122. The step of block 124 indicates that the method 100 further includes discarding the other (later) configuration updates and/or recording the other (later) configuration updates in a separate ledger. At this point, the method 100 proceeds to block 126.

When the proposed configuration update has thereby been validated, block 126 includes the step of enacting the new configuration update in the network element. As indicated in block 128, the method 100 includes creating a new block to be added to the end of a blockchain associated with the network element being changed. In block 130, the method 100 includes a step of performing a cryptographic operation to the content of the last block in the blockchain, which includes all changes and updates already made. Block 132 includes adding the cryptographic data of previously enacted updates to the new block. Block 134 includes recording the new configuration update as a transaction in the new block. The method 100 also includes recording supplemental information with the transaction, as indicated in block 136. The supplemental information, for example, may include one or more timestamps regarding the times when the configuration update was proposed and/or enacted. The supplemental information may also include a unique ID of the device or port of the computing device 18 or AI device 20 that proposed the update, information about the new configuration update, and metadata. For instance, the metadata may include a machine learning (ML) model of an AI device 20, performance metrics of the AI device 20, smart contract information, service level agreement (SLA) information, etc.

The method 100 then proceeds to decision diamond 138, which includes a step of determining if a ledger, which includes the blockchain, is to be distributed to the computing devices 18 and/or AI devices 20 on the network 12. If not, the method 100 proceeds to block 140, which indicates that the updated blockchain is stored in a central ledger, such as in the database 24 associated with the network management system (NMS) 22. However, if it is determined in decision diamond 138 that the ledger is to be distributed, the method proceeds to block 142, which indicates that the updated ledger, with information about the newly enacted configuration update, is distributed to the network devices (e.g., one or more of the computing device 18, AI devices 20, and/or NMS 22. At this point, the method 100 ends and can be repeated when another configuration update is proposed for the same or a different network element 14 or IoT device 16.

FIG. 8 is a flow diagram showing another embodiment of a method 150 for enacting and recording configuration updates in a network. In block 152, the method 150 includes a step of enabling an agent associated with a computer connected to a production network to request a new configuration update regarding a first network element on the production network. The method also includes storing in an electronic ledger a history of one or more configuration updates that have been previously enacted with respect to the first network element, as indicated in block 154.

According to some embodiments, the step of storing the history in the electronic ledger, as described in block 154, may further include the step of storing a new block of a blockchain in the electronic ledger when the new configuration update is enacted, as indicated in block 156. Furthermore, the method 150 may also include the step of distributing the electronic ledger to a plurality of computers associated with a plurality of artificial intelligence (AI) agents and human agents, as indicated in block 158. Block 160 includes another step of grouping configuration updates occurring in the same configuration time window into a single block of the blockchain. The method 150 may also include the steps of computing a cryptographic hash of the configuration updates that have been previously enacted (block 162) and storing the cryptographic hash in the electronic ledger (block 164).

Also, the method 150 may include additional steps, such as enabling a human agent to confirm a new configuration update requested by an artificial intelligent (AI) agent, as indicated in block 166. The method 150 may also include the step of storing cryptographic keys in a memory of the computer, as indicated in block 168, whereby the cryptographic keys are used for authentication of an associated agent.

To validate and maintain the integrity of the "configuration chain" ("ConfigChain") or blockchain of configuration updates, a "proof of trust" validation mechanism can be used. The proof of trust does not require computationally expensive proof of work. With this model, all agents (whether AI-based or human) are ranked, based on their trustworthiness.

Several metrics may be accounted for when computing the trustworthiness of a node, including, but not limited to: 1) seniority, which may be based on how long the node has been part of the collaborative system 10 or the number of blocks it has validated; 2) accuracy, which may be based on the number of invalid configurations previously pushed. In the case of reinforcement-learning-based agents, the "accuracy" could be defined, for instance, as a function of the (normalized) expected reward of the agent; 3) special rights (e.g., administrative rights), which may be useful if an operator requires a human with higher permissions to validate potentially harmful configuration updates pushed by an AI agent. Special rights may also be granted to the orchestrator (e.g., MDSO) or the policy engine that effectively pushes the configurations down to the NEs; and 4) any other metrics that can help establish the trustworthiness of an agent. For example, if reinforcement-learning-based AI agents are managing bandwidth allocation of network elements, the RL agent managing an NE with more bandwidth could be considered more trustworthy than the agent managing an NE with lower capacity.

For instance, older nodes, NOC operators or AI agents with higher accuracy will be deemed more trustworthy and get a higher coefficient. Note the trust level of a node may vary over time. If an agent (with special rights or not) is flagged as rogue (i.e., tries to falsify the chain), then his trust level should be severely impacted or even excluded from the system.

When an agent pushes a new configuration to the system for close-loop applications, one or several nodes, whose combined trust is greater than the node which initiated the transaction, may also receive and validate the configuration update before recording them in a block in the chain. The probability that a node is chosen for the validation depends on its trust level. This prevents new rogue agents from pushing arbitrary configurations to the system, and also prevents rogue agents from altering past blocks as multiple more trustworthy agents are required. To record in ConfigChain that the configuration update was validated, the validating agent(s) are only required to sign it using their private key (for non-repudiation), similar to the signature of the agent that initiated the configuration update/change/transaction.

The validation process may be simple (e.g., validating configuration format) or more involved. For instance, the agent validating the update may detect that a change is potentially risky and requires elevated privileges from an agent with a higher trust level or special rights (e.g., a human operator). Risky configurations could be based for instance on the services running on a port (e.g., changing something that affects high priority traffic is potentially riskier than changing best-effort services), margins, protection paths, etc. Once an agent has validated (e.g., signed) the update and created the block, it is recorded as an immutable entry in the ledger and distributed to all other agents.

For networks with a large number of agents, it is possible that a double-spend problem is encountered, i.e., when two agents try to invoke the same configuration update. In this case, an update is allowed to go through once the hash function has been found, keeping only the transaction with the earliest timestamp. This also ensures that the ledger only contains updates that were applied to the network. A separate ledger can be maintained to catalog the results of each transaction, whether or not they were accepted by the particular node.

In addition, there is typically some delay before a configuration update request becomes effective. For instance, switching an MPLS tunnel to protection path using MCP typically takes a few minutes before being effective. In this case, the confirmation by the NMS that the new configuration is effective will be recorded as a new transaction in a new block, either by notifying the agent who initiated the update or by the device directly using VNFs if the device supports it.

Thus, the systems and methods of the present disclosure provide a secure, reliable, and auditable transactional configuration system based on blockchains and state-of-the-art cryptographic techniques. The full history of configuration transactions is persisted in a secure manner in a central or distributed ledger. The transactions (i.e., the new configuration) can optionally be validated by the node computing the corresponding block to be added to the ledger. Relevant metadata, including a machine learning (ML) model (if AI agent) and performance metrics required for smart contracts and SLAs, may be saved in each block of the chain in addition to the new policy and new configuration of the device.

Other advantages of the present disclosure include different modes of operations to perform cryptographic operations and blockchain computations. The computations, for example, may be distributed between all agents or actors, may be centralized for legacy systems, and may use virtual network functions (VNFs).

The collaborative system 10 enables collaboration between humans and AI agents. Configuration updates from both humans and AI can be registered in the ledger. The collaborative system 10 may be used in an unsupervised environment or in supervised or semi-supervised systems where a human expert may be involved in a validation process to validate or invalidate the new configuration or policy proposed by an AI agent.

Another advantage of the present application is that any transaction can be easily traced back to the source of the change. It is therefore possible to reliably and unambiguously establish the chain of responsibility, which can be used for service assurance purposes, for example, in the case of a configuration error resulting in network issues and SLA breaches.

Also, the embodiments of the present disclosure can also cover classic legacy software applications, not necessarily related to AI.

The systems disclosed herein can also be used to support new business models and billing methods from a software vendor viewpoint. For example, the systems can be used to track license compliance and can track utilization for a pay as you go (PAYG) system. The systems can also be related to modular software built around APIs or building blocks (e.g., BPA), where fees could be applied per block usage. As an example, two AI-based agents with different levels of sophistication may be available in the software to the customer and billed differently depending on usage and accuracy of predictions Other advantages of the systems of the present disclosure can be realized. Regarding network security solutions, for example, leveraging a blockchain structure can guarantee a true state of the components within the collaborative network 10. Any unauthorized change in the state may represent an attack, whether internal or external and can be detected with essentially 100% accuracy. Works by establishing the baseline configuration for each asset (i.e., Clean State Proof) can be used to compare current configurations with a baseline to check the integrity of the asset if its configuration was altered. If so, its alert can be raised. The system 10 can also be used to validate the integrity of the data flow in an SDN between CDN and end-user by validating the integrity of the configuration of the nodes between two end-points of the path.

The present systems can be used to overcome the shortcomings in the prior art. It was discovered that a customer's network had been incorrectly configured for years and was not collecting any performance metrics for the physical layer, which accounts for over 75% of the nodes managed in this network. This resulted in a significant fraction of the network being left unmonitored. Using the systems of the present disclosure, the complete history of the configuration is registered in the ledger. Also, additional notes and relevant performance metrics may be recorded, enabling operators to have complete visibility of the system.

The transactions (i.e., the new configuration) can optionally be validated by the node computing the corresponding block to be added to the ledger. The system 10 enables collaboration between humans and AI agents. Configuration updates from both humans and AI will be registered in the ledger. The system can encompass semi-supervised systems where a human expert may be required to validate the new configuration proposed by the AI agent.

Transactions can be traced back to the source. It is therefore possible to reliably and unambiguously establish the chain of responsibility, which may be important for service assurance purposes, for instance in the case of a configuration error resulting in network issues and SLA breaches. In addition, a significant number of network issues originate from configuration errors. This invention would provide a secure and reliable system that can clearly establish the liability of each party for service assurance purposes.

A feature is that each configuration block contains within itself a hash of the previous configuration/set of PMs. This property makes the proposed system secure and reliable. Any tempering of a block will change its hash, and all subsequent hashes thereby breaking the chain registered in the ledger. As the ledger is shared between all agents in the system, altering the copy of the ledger of any of those actors would result in a discrepancy which can be easily flagged.

Improving the trustworthiness of AI-based smart policy engines and visibility to carriers overall network configuration operations (whether automated or manual), while enabling collaboration with between AI and human operators, is critical for wide adoption of adaptive network technologies in production networks.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:

a Network Management System (NMS) connected to a production network, the production network including a plurality of network elements in a collaborative environment in which a plurality of agents are configured in a peer-to-peer structure to collaboratively contribute configuration updates for the plurality of network elements, the NMS configured to receive, from one of the plurality of agents, a proposal for a new configuration update, created by the one of the plurality of agents, to be implemented on a first network element of the plurality of network elements in the production network, wherein the one of the plurality of agents is an artificial intelligence (AI) agent implemented on one or more computing devices connected to the production network; and an electronic ledger in communication with the NMS, the electronic ledger configured to store, in a blockchain, an encrypted record of one or more configuration updates that have been previously implemented on the first network element, the encrypted record including which of the plurality of agents created and proposed the one or more configuration updates;

wherein the NMS is configured to review the proposal for the new configuration update to determine if the new configuration update is acceptable based on one or more of a validation of the one of the plurality of agents, a level of trust for the one of the plurality of agents, and a level of trust of the first network element, wherein, when the new configuration update is determined to be acceptable, the NMS is configured to enable implementation of the new configuration update on the first network element and store the new configuration update in a new block of the blockchain in the electronic ledger, the storing of the new configuration update including a record that the one of the plurality of agents created and proposed the new configuration update.

2. The system of claim 1, wherein the new block of the blockchain is configured to store the new configuration update along with the one or more configuration updates that have been previously implemented on the first network element.

3. The system of claim 2, wherein the NMS includes a network interface configured to distribute the electronic ledger to a plurality of computers associated with the plurality of agents.

4. The system of claim 2, wherein the new block includes a timestamp, a unique ID of the computer, the new configuration update, and metadata.

5. The system of claim 4, wherein the metadata includes at least one of a machine learning (ML) model of an AI device that proposes the new configuration update, performance metrics of the AI device, and a service contract outlining conditions that prompted the new configuration update.

6. The system of claim 2, wherein configuration updates occurring in the same configuration time window are grouped into a single block, and wherein pending configuration updates are not stored in the block.

7. The system of claim 2, wherein the NMS is configured to compute a cryptographic hash of the one or more previously implemented configuration updates and store the cryptographic hash in the electronic ledger, whereby modifying content of a previously accepted configuration update would create an easily identifiable discrepancy.

8. The system of claim 1, wherein the one or more configuration updates include at least one update or optimization of a configuration of the first network element and include transactions associated with the first network element according to a collaboration between at least one AI agent and at least one human agent.

9. The system of claim 8, wherein, for acceptance, configuration updates proposed by AI agents are confirmed by a human agent associated with the NMS.

10. The system of claim 1, wherein the NMS is configured to review the new configuration update based on a trust score associated with the one of the plurality of agents.

11. The system of claim 1, wherein a computer associated with the first agent comprises a memory configured to store the electronic ledger, and wherein the memory is further configured to store cryptographic keys used for authentication of the one of the plurality of agents.

12. A method comprising the steps of:
in a collaborative environment in which a plurality of agents in a peer-to-peer structure are configured to collaboratively contribute configuration updates for a plurality of network elements of a production network, receiving, from one of the plurality of agents, a proposal for a new configuration update, created by the one of the plurality of agents, to be implemented on a first network element of the plurality of network elements in the production network, wherein the one of the plurality of agents is an artificial intelligence (AI) agent implemented on one or more computing devices connected to the production network;
storing, in a blockchain in an electronic ledger, a history of one or more configuration updates that have been previously implemented on the first network element, the history including which of the plurality of agents created and proposed the one or more configuration updates;
reviewing the proposal for the new configuration update to determine if the new configuration update is acceptable based on one or more of a validation of the one of the plurality of agents, a level of trust for the one of the plurality of agents, and a level of trust of the first network element; and
when the new configuration update is determined to be acceptable, enabling implementation of the new configuration update on the first network element and storing the new configuration update in a new block of the blockchain in the electronic ledger, the storing of the new configuration update including a record that the one of the plurality of agents created and proposed the new configuration update.

13. The method of claim 12, further comprising the step of distributing the electronic ledger to a plurality of computers associated with the plurality of agents, the plurality of agents including a plurality of AI agents and human agents.

14. The method of claim 12, further comprising the step of grouping configuration updates occurring in the same configuration time window into a single block of the blockchain.

15. The method of claim 12, further comprising the steps of:
computing a cryptographic hash of the one or more configuration updates that have been previously implemented; and
storing the cryptographic hash in the electronic ledger.

16. The method of claim 12, further comprising the step of enabling a human agent to confirm a second new configuration update proposed by an AI agent.

17. The method of claim 12, further comprising the step of storing cryptographic keys in a memory configured to store the electronic ledger, the cryptographic keys used for authentication of the one of the plurality of agents.

18. A network feedback loop connected to a production network, the network feedback loop comprising:
a data telemetry device configured to monitor a condition of a first network element of a plurality of network elements in the production network having a collaborative environment in which a plurality of agents are configured in a peer-to-peer structure to collaboratively contribute configuration updates for the plurality of network elements;
an artificial intelligence (AI) device configured to receive an indication from the data telemetry device regarding the condition of the network element, the AI device configured to determine a proposal for a new configuration update to be implemented on the first network element based on the condition;
a controller configured to enable implementation of the new configuration update on the first network element when it is determined that the new configuration update is acceptable based on one or more of a validation of the AI device, a level of trust for the AI device, and a level of trust of the first network element; and
a memory configured to store the new configuration update in an electronic ledger as a new block of a blockchain, the new block configured to store the new configuration update along with an encrypted record of one or more configuration updates that have been previously implemented on the first network element, wherein the encrypted record includes which of the plurality of agents created and proposed the one or more configuration updates and the new configuration update includes a record that the one of the plurality of agents created and proposed the new configuration update.

19. The network feedback loop of claim 18, wherein the AI device is configured to compute a cryptographic hash of the previously implemented configuration updates and store the cryptographic hash in the electronic ledger.

20. The network feedback loop of claim 18, wherein the controller is configured to receive input from a human operator.

* * * * *